United States Patent [19]

Brand et al.

[11] Patent Number: 4,503,740
[45] Date of Patent: Mar. 12, 1985

[54] OPTICAL CUTTING EDGE LOCATOR FOR A CUTTING APPARATUS

[75] Inventors: Robert D. Brand, Lawrence; Ralph D. Runyan, Indianapolis, both of Ind.

[73] Assignee: Capital Machine Company, Inc., Indianapolis, Ind.

[21] Appl. No.: 340,506

[22] Filed: Jan. 18, 1982

[51] Int. Cl.³ .................... B26D 7/00; B26D 5/20; B26D 7/27

[52] U.S. Cl. .................... 83/521; 83/520; 83/522

[58] Field of Search .................... 83/520, 521, 522

[56] References Cited

U.S. PATENT DOCUMENTS

| | | | |
|---|---|---|---|
| 1,804,764 | 5/1931 | Grant | 83/521 |
| 2,806,492 | 9/1957 | Becker | 83/520 |
| 3,205,738 | 9/1965 | Ballmer et al. | 83/521 |
| 3,656,391 | 4/1972 | Arx | 83/521 |
| 4,059,475 | 11/1977 | Gernhardt et al. | 83/521 |
| 4,257,297 | 3/1981 | Midbella | 83/520 |

FOREIGN PATENT DOCUMENTS

| | | | |
|---|---|---|---|
| 511762 | 10/1930 | Fed. Rep. of Germany | 83/520 |
| 1418235 | 10/1964 | France | 83/521 |
| 381360 | 10/1930 | United Kingdom | 83/521 |

Primary Examiner—Paul A. Bell
Assistant Examiner—Paul M. Heyrana, Sr.
Attorney, Agent, or Firm—Barnes & Thornburg

[57] ABSTRACT

An optical cutting edge locator for a cutting machine having a knife for cutting single or multiple sheets of material comprises a light source, a light-projecting system above the knife for downwardly projecting a beam of light from the light source along a planar surface of the knife generally perpendicular to the material, thereby to cause a shadow to be cast by the cutting edge of the knife and to create a line between a shadow area and a light area on the material in substantially the same plane as the cutting edge. The light-projecting system includes either a plurality of fiber optic transmission lines having light-emitting ends mounted above the knife or an elongated slot above the knife. The plane of the planar surface of the knife generally bisects either the light-emitting ends of the fiber optic transmission lines or the elongated slot so that the beam of light being downwardly projected is split by the planar surface of the knife.

15 Claims, 10 Drawing Figures

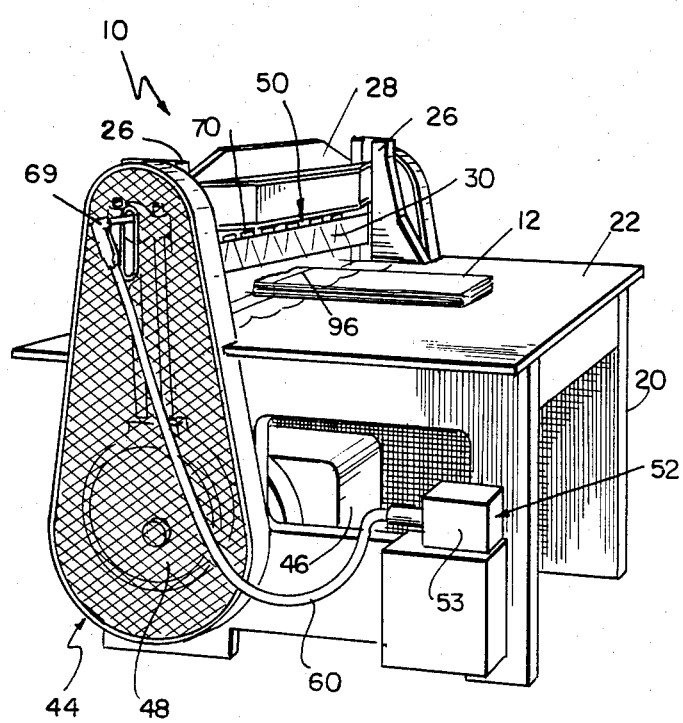
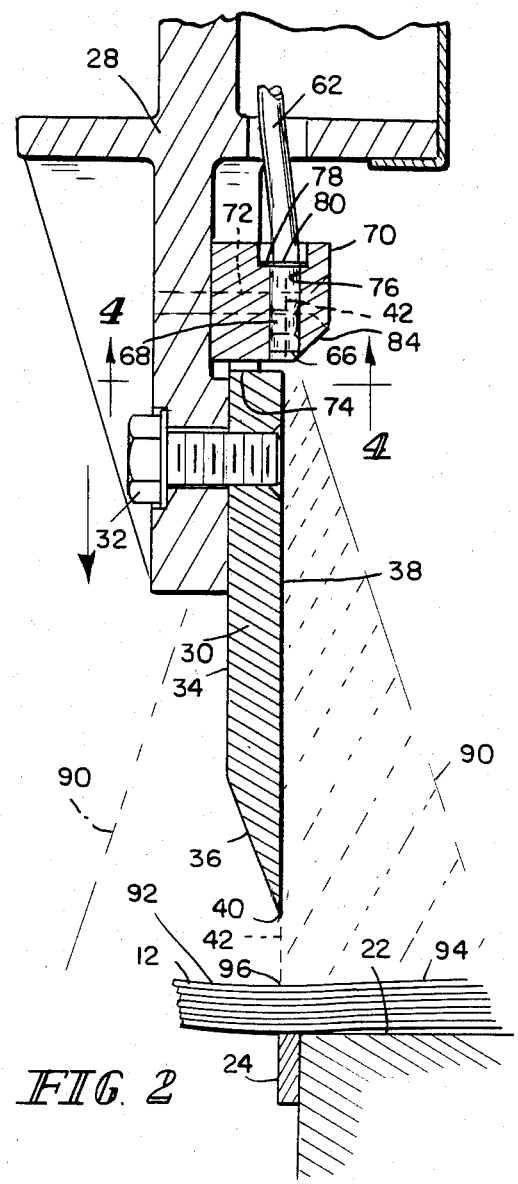
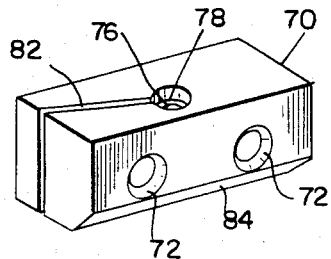
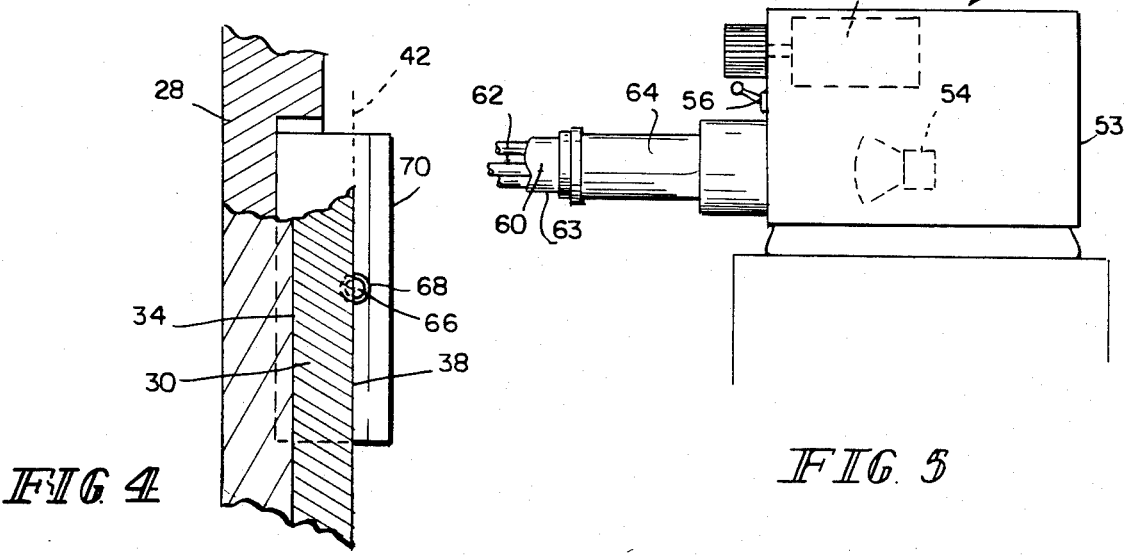

OPTICAL CUTTING EDGE LOCATOR FOR A CUTTING APPARATUS

The present invention relates to optical cutting edge locators for a cutting apparatus, and more particularly to improvements in an optical locator for increasing the accuracy and efficiency of operation of the cutting apparatus.

Cutting machines having a knife which is movable downwardly to engage and cut through single or multiple sheets of wood, paper, metal, plastic, and other similar materials are well known in the art. Typically, the sheet or sheets of materials to be cut are located on a surface by hand in relationship to a mark or a feature in the material which is to be removed. Usually, these machines have a flat table surface for supporting the sheet or sheets of material to be cut. The machines include a reciprocating carriage movable generally perpendicular to the surface and a cutting knife connected to the carriage for engaging and cutting through the material when the carriage is moved downwardly. The material is located under the cutting knife so that the cut will be made where desired. The desired location of the cut is determined by the machine operator in relationship to either a stationary mark or an undesirable feature of the material. Since the cutting edge of the knife is in spaced relationship to the table surface and material, it has been a problem to accurately position the material relative to the cutting edge.

Various systems have been developed for marking or indicating where the material will be cut when the knife is actuated. Some of these systems use a brilliant light source and a thin plate or wire placed in front of the light source to project a shadow line onto the material. Other systems have used a laser to project a line of colored light onto the material. The plate, wire, or laser are aligned with the cutting edge so that the projecting line provides an indication where the cutting edge will cut the material. In order for the shadow line or the colored laser line to be visible, it has been necessary that these lines have a significant width. Thus, it is difficult for the machine operator to identify exactly where the cut will be made. In view of this fact, the operator usually locates the material short of the line for an initial cut. If the initial cut is sufficiently close to the desired location of the cut or removes the undesired defect, no additional cuts are required. However, many times it is necessary to perform additional cutting operations in order to approximate the actual desired location of the cut or to remove the undesired feature. This practice is extremely inefficient, inaccurate, and causes unnecessary wear to machine parts.

Furthermore, since the light or laser source is located to the side of the cutting machine, it has heretofore been necessary to locate the light or laser source a considerable distance from the sheet or sheets of material so that the projected line will have sufficient length to span the sheet or sheets of material. The construction of the prior systems has not permitted them to be mounted directly above the material. Thus, the shadow line or laser line is typically projected at an angle to the material. As long as the sheet of material or stack of sheets of material has the same thickness, no adjustment of the light source or laser source is necessary. On the other hand, if the thickness of the material varies between successive cutting operations, then the angle of incidence with respect to the sheet or sheets of material will vary in relation to changes in the thickness of the material. Unless the light source or laser source is adjusted, this change in angle of incidence will result in distortion of the projected line, creating further inaccuracies in the location of the material relative to the cutting edge of the knife. These and other problems associated with conventional optical cutting edge locators are eliminated by the locator of the present invention.

It is one object of the present invention to provide an improved optical cutting edge locator which increases the accuracy and efficiency of a cutting machine.

It is another object of the present invention to provide an optical cutting edge locator for directing a beam of light downwardly along the planar surface of the knife, thereby to cause a shadow to be cast by the cutting edge of the knife onto the sheet of material and to define a line between a shadow area and a light area on the sheet of material which is in substantially the same plane as the cutting edge of the knife.

Yet another object of the present invention is to provide an optical cutting edge locator for producing a sharp distinct line having no definable width for indicating on the sheet or sheets of material where the cutting edge of the knife will engage and cut through the material and which further does not require adjustment with respect to changes in thickness of the sheet or sheets of material to be cut.

Yet another object of the present invention is to provide an optical cutting edge locator for creating a pattern of light on the sheet or sheets of material having its greatest luminous intensity in proximity to a line defined by a shadow cast by the cutting edge of the knife.

Yet another object of the present invention is to provide an optical cutting edge locator where the light is transmitted by a plurality of optical transmission lines from a remote location to a location above and adjacent to the knife.

These and other objects are achieved in a cutting apparatus by providing an optical cutting edge locator which includes a light source, transmitting means for transmitting light from the light source to above the knife to project a beam of light downwardly along the planar surface of the knife, thereby to cause a shadow to be cast by the cutting edge and to define a line between a shadow area and a light area on the sheet of material in substantially the same plane as the cutting edge.

In one embodiment, the transmitting means includes a plurality of fiber optic transmission lines having their light-emitting ends mounted above the knife. In another embodiment, the transmitting means includes an elongated slot above the knife through which light is projected. According to the present invention, the plane of the planar surface and cutting edge of the knife substantially bisects the light-emitting end of each of the fiber optic transmission lines or the elongated slot to split the beam of light being projected downwardly along the planar surface and produces a light area pattern on the material to be cut having its greatest luminous intensity in proximity to the line defined between the light area and shadow area.

Other features and advantages of the present invention will become apparent in view of the following detailed description of embodiments thereof exemplifying the best mode of carrying out the invention as presently perceived, which description should be considered in conjunction with the accompanying drawings. In the drawings:

FIG. 1 is a perspective view of a cutting apparatus, including one embodiment of an optical cutting edge locator constructed according to the present invention;

FIG. 2 is a transverse view, partly cross-sectioned and partly broken away, of a section of the apparatus of FIG. 1 showing a portion of the optical locator of the present invention;

FIG. 3 is a perspective view of a fragment of the optical locator shown in FIGS. 1 and 2;

FIG. 4 is a cross-sectional view of the portion of the optical locator shown in FIG. 2, taken generally along section lines 4—4 in FIG. 2;

FIG. 5 is a diagrammatic illustration of the light source for the optical locator shown in FIG. 1;

Figure 6:
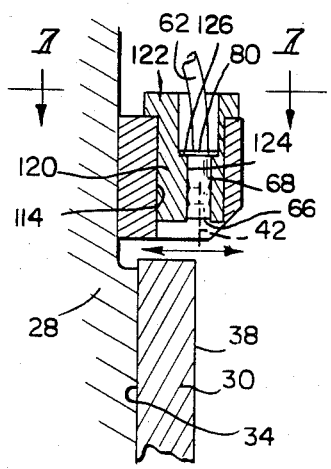
FIG. 6 is a transverse view, partly cross-sectioned, of another embodiment of the portion of the optical locator shown in FIGS. 2-4.

Referring to FIGS. 1-5, a machine 10 for cutting a single sheet or multiple sheets of material 12, such as wood veneers, fabrics, paper, plastics, rubber, leather, batting, insulation, light metals, or fiberboards, either singly or in packs, includes a base 20 for supporting a flat table surface 22 on which the material 12 is placed for cutting. The table surface 22 provides a stationary cutting edge or bar 24, as best shown in FIG. 2, or a resilient, replaceable piece commonly referred to as a "cutting stick" (not shown) which cooperates with a cutting knife 30 to cut through the material 12. The machine 10 also includes a pair of laterally spaced channels or guides 26, each having elongated channels generally perpendicular to the table surface for slidably receiving ends of a movable carriage 28. Carriage 28 moves in a plane which is generally perpendicular to the table surface 22. As best shown in FIG. 2, the cutting knife 30 is connected to the movable carriage 28 by means 32, such as a bolt, so that the cutting knife 30 is movable upward and downward generally perpendicular to the table surface 22 in response to movement of the carriage 28.

Referring more particularly to FIG. 2, the cutting knife 30 includes a front planar surface 34, a downwardly extending oblique surface 36, and a back planar surface 38 extending downwardly and forming with the oblique surface 36 a sharp cutting edge 40. The back planar surface 38 and the cutting edge 40 are provided in a single plane 42. The sheet or sheets of material 12 are cut by moving the knife 30 downwardly in the direction of the arrow in FIG. 2 either past the stationary cutting edge or bar 24 or into a resilient "cutting stick" (not shown). The space between the cutting edge 40 and the table surface 22 prior to downward movement of the knife 30 can be as much as 6.5 inches (16.51 cm).

A drive mechanism 44 shown in FIG. 1 is coupled to the carriage 28 for reciprocally moving the knife 30 downwardly and upwardly with respect to the table surface 22. In the illustrative embodiment, the drive mechanism 44 includes a motor 46 for driving a camming device 48. Camming device 48 is connected to carriage 28 so that operation of motor 46 causes movement of carriage 28. It will be understood that various other drive mechanisms may be employed for reciprocally moving the carriage 28 and knife 30 upwardly and downwardly without departing from the scope of the present invention. Thus, it is not intended that the present invention be limited to the drive mechanism 44 shown in FIG. 1.

In cutting machines 10 of the type described above, the length of the knife 30 may range between a few inches to, in some instances, more than thirty feet. In most cutting operations, the sheet or sheets of material 12 are to be cut to a particular size or are to be cut close to an undesirable feature in the material to remove such feature from the finished product. Thus, it is desirable that the cut be accurate. For example, a typical tolerance limit for a cut is plus or minus 0.030 inch (0.076 cm). In view of these tolerance limits, it is necessary to accurately locate the material 12 relative to the cutting edge 40 of the knife 30 so that the cutting edge 40 cuts the material 12 within the tolerance limitations of the desired cut location. Thus, locating and accurately indicating on the material 12 where the cutting edge 40 will engage and cut the material 12 are very important.

An optical cutting edge locator 50 constructed according to the present invention downwardly projects a beam of light from a position directly above the knife 30 so that the light beam is directed along the back planar surface 38 onto the material 12, thereby to cause a shadow to be cast by the cutting edge 40 of the knife 30 for purposes of locating the material 12 relative to the knife 30 cutting edge 40. By projecting a very small brilliant beam of light along the planar surface 38 from directly above the material 12, a very sharp demarcation line is produced between a light area and a shadow area on the material 12 with very little light scatter past the cutting edge 40. Since the line does not have a definable width, it produces a very accurate indication on the material 12 where the cutting edge 40 will engage and cut the material 12.

Referring to FIGS. 1-8, the optical locator 50 includes a light source 52, best shown in FIG. 5. The light source 52 includes a housing 53 for mounting the source 52 adjacent to the cutting machine 10, a high-intensity light bulb 54 in the housing, a switch 56 for turning the light bulb 54 on and off, and a dimmer switch 58 for adjusting the luminous intensity of the bulb 54.

A means for transmitting light from the light source 52 to locations above and adjacent to the knife 30 includes a bundle 60 of fiber optical transmission lines 62. The light-receiving ends 63 generally indicated at the transmission lines 62 in the bundle 60 are exposed to the light source 52 by coupling 64 so that light from the light bulb 54 is directed into the light-receiving ends 63. Each fiber optic transmission line 62 also includes a distal light-emitting end 66. The light-emitting end 66 of each transmission 62 is encased in a casing 68 for mounting above the knife 30. Because of the flexibility of the bundle 60, the light source 52 may be mounted remote from the movable carriage 68 and knife 30 and connected thereto by a coupling 69. Furthermore, the light-emitting ends 66 of the transmission lines 62 can be made very thin or wide as necessary. In the preferred embodiment, the light-emitting ends 66 of the transmission lines 62 are mounted at discrete intervals above the knife 30 to produce either a continuous or intermittent demarcation line on the material 12.

A plurality of mounting members 70, particularly shown in FIGS. 2-4 are mounted to the carriage 28 along and transverse to the back planar surface 38 of the knife 30 using openings 72 and conventional means such as screws. A spacer 74 may be interposed between each mounting member 70 and the knife 30, as shown in FIG. 2. The plurality of mounting members 70 are spaced apart at equal intervals along the back planar surface 38. In the preferred embodiment, each mounting member is generally rectangular in shape and constructed of metal. Each member 70 includes a bore 76 which is substantially bisected by the plane 42 of the back surface 38 when the member 70 is mounted to the carriage 28. The bore 76 includes a shoulder 78. A casing 68 for the light-emitting end 66 of a transmission line 62 is received in the bore 76 and a flange 80 on the casing seats on the shoulder 78. Each mounting member 70 includes a clamping slot 82 extending from a peripheral surface of the member 70 to the bore 76, as best shown in FIG. 3, for clamping the casing 68 in the bore 76 when the member 70 is mounted to the carriage 28. A longitudinal edge of each member 70 is bevelled to produce a chamfer surface 84 which contacts the material 12 when the back surface 38 passes the stationary cutting edge 24 during the cutting operation.

As shown in FIG. 2, each light-emitting end 66 produces a generally conical beam of light 90 which is projected downwardly along the back planar surface 38 of the knife 30 generally perpendicular to the material 12. The plane 42 of the back surface 38 and the cutting edge 40 substantially bisects each light-emitting end 66 so that the conical beam of light 90 is generally split in half. Substantially one-half of the beam of light 90 is blocked by the knife 30 and the cutting edge 40 causes a shadow area 92 to be produced on the material 12. The other one-half of the beam of light 90 produces a generally semicircular light area 94 on the material 12. A line 96 having substantially no definable width is defined between the shadow area 92 and the light area 94.

Figures 8, 10:
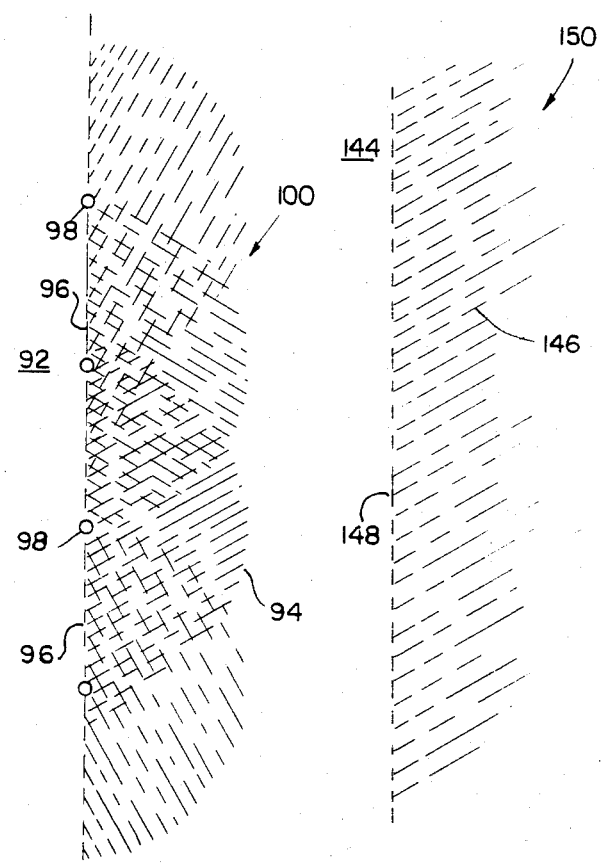
FIG. 8 is a diagrammatic illustration of a light area pattern produced by the optical locator shown in FIGS. 1-7 on a sheet of material to be cut.
FIG. 10 is a diagrammatic illustration of a light pattern produced by the optical location shown in FIG. 9 on a sheet of material to be cut.

Referring to FIG. 8, points 98 shown along the line 96 are on the same axis as the centers of the light-emitting ends 66 of the transmission lines 62. The luminous intensity of the light area 94 produced by each light-emitting end 66 is greatest in proximity to the points 98 and gradually decreases radially outwardly therefrom. The light-emitting ends 66 are spaced at intervals along the back surface 38 so that portions of each light area 94 overlap to produce a pattern 100 as shown in FIG. 8. In general, the interval between each light-emitting end 66 is equivalent to the radius of the semicircular light area 94 produced by the light-emitting end 66 on the material 12. Thus, the interval may vary, depending upon the distance between the light-emitting ends 66 and the table surface 22. For example, where the distance between the light-emitting end 66 and the table surface 22 is approximately 10.5 inches (26.67 cm), the interval is approximately 6 inches (15.24 cm). For exceptionally long knives 30, it may be desirable to use more than one light source 52 and use more than one bundle 60 of fiber optic transmission lines 62. In the illustrative embodiment, six fiber optic transmission lines 62 are shown with the light-emitting ends 66 mounted at intervals of 6 inches (15.24 cm) in a machine 10 with a knife 30 having a length of 36 inches (91.44 cm).

Figure 7:
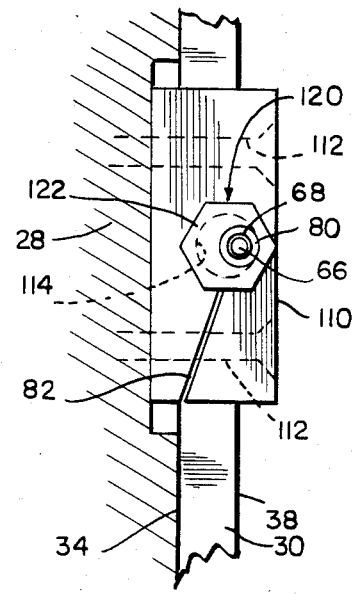
FIG. 7 is a cross-sectional view of the portion of the optical locator shown in FIG. 6, taken generally along section lines 7—7 in FIG. 6.

An alternative embodiment of a mounting member 110 is shown in FIGS. 6 and 7. In FIGS. 6 and 7, the same reference numerals are used to identify the same or similar parts which have been previously described. The mounting member 110 is connected to the carriage 28 using openings 112 and conventional means such as screws. Each mounting member 110 includes a cylindrical bore 114 for receiving a cylindrical plug 120 which is rotatable in the bore 114. The plug 120 includes a head 122 providing means for grasping and rotating the plug 120 in the bore 114. The plug 120 also includes an eccentric cylindrical bore 124 generally equivalent to the bore 76 of the mounting member 70. The bore 124 includes a shoulder 126 and receives a casing 68 for the light-emitting end 66 of a fiber optic transmission line 62. Shoulder 80 of the casing 68 seats on the shoulder 126. By rotating the plug 120, the transverse position of the light-emitting end 66 relative to the knife 30 can be adjusted in the direction of the arrows shown in FIG. 6 to assure that the plane 42 of the back surface 38 of the knife 30 substantially bisects the light-emitting end 66. This adjustment feature is particularly useful in view of the fact that knives 30 many times do not have the same thickness. Thus, the position of the light-emitting ends 66 can be adjusted for various thicknesses of knives 30.

Figure 9:
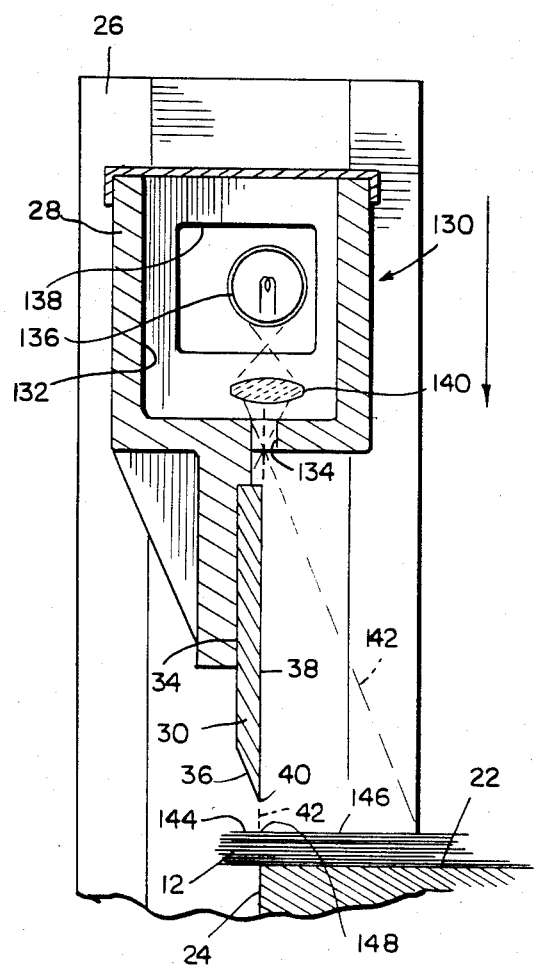
FIG. 9 is a transverse view, partly cross-sectioned and partly broken away, of a cutting apparatus including another embodiment of an optical cutting edge locator constructed according to the present invention.

Another embodiment of an optical cutting edge locator 130 constructed according to the present invention is shown in FIGS. 9 and 10. In FIGS. 9 and 10, parts similar to those previously described are referred to by the same reference numeral.

The optical cutting edge locator 130 employs a cavity 132 formed in the carrier 28. An elongated slot 134 is formed in the bottom of the cavity 132 and extends along the length of the knife 30 so that the plane 42 of the back surface 38 substantially bisects the slot 134 in a longitudinal direction. A light source 136 may be mounted exterior to the cavity 132 and thus remain stationary, or the light source 136 may be mounted inside the cavity 132 and move coincidentally with the carriage 28. If the light source 136 is mounted exterior to the cavity 132, a window 138 is provided in the end of the carriage 28 to allow the light from the light source 136 to be directed into the interior of the cavity 132.

Light-transmitting means 140 may include a focussing lens mounted inside the cavity 132 above the elongated slot 134 to transmit light from the light source 136 through the slot 134 and project a continuous wedge-shaped beam of light 142 downwardly and along the back surface 38 of the knife 30. As previously described, the cutting edge 40 causes a shadow to be cast onto the material 12, producing a shadow area 144 and a continuous light area 146 having a line 148 defined between the two areas 144 and 146. The line 148 is in substantially the same plane 42 as the back surface 38 and the cutting edge 40 to accurately indicate on the material 12 where the cutting edge 40 will engage and cut through the material 12. As best shown in FIG. 10, the light beam projected along the back surface 38 produces a pattern 150 in the light area 146 where the luminous intensity of the light is greatest in proximity to the continuous line 148 and gradually decreases as the distance from the line 148 increases.

It can be appreciated that there may be various other means for providing the light from directly above the knife 30 and along the back surface 38. For example, an elongated fluorescent tube may be mounted within the cavity 132 in the embodiment shown in FIG. 9. Thus, various modifications to the embodiments described above could be made without departing from the scope of the present invention.

What is claimed is:

1. In a cutting apparatus including a working surface for supporting material to be cut, a movable carriage above the working surface, a knife connected to the carriage, the knife having a downwardly extending planar surface providing a cutting edge in substantially the same plane as the planar surface for cutting through the material in response to movement of the carriage, and optical means for locating the material relative to the cutting edge, the improvement wherein the optical means comprises a light source, at least one light transmission line coupled to the light source, the transmission line including a light-emitting distal end for producing a beam of light, mounting means for mounting the light-emitting end of the transmission line to the carriage above the knife whereby the planar surface of the knife bisects the light-emitting end of the transmission line, and means for blocking substantially one half of the beam of light, the other one half of the beam of light being projected downwardly along the planar surface toward the material, thereby causing the cutting edge to cast a shadow and define a single line between a shadow area and a light area on the material in substantially the same plane as the cutting edge.

2. The cutting apparatus of claim 1 wherein the light-emitting end of the transmission line produces a generally conical beam of light, substantially one half of the conical beam being projected along the planar surface to produce a substantially semicircular light area on the material, the luminous intensity of the light area being greatest in proximity to the line.

3. The cutting apparatus of claim 2, further comprising first connecting means for attaching the knife to the carriage, second connecting means for attaching the mounting means to the carriage adjacent the knife, the light-emitting end and the knife thus being moved coincidently in response to movement of the carriage, and stationary means for locating the light source away from the movable carriage.

4. The cutting apparatus of claim 3 wherein the mounting means includes adjustment means for transversely positioning the light-emitting end in relation to the plane of the planar surface to assure that the plane substantially bisects the light-emitting end.

5. The cutting apparatus of claim 4 wherein the adjustment means includes a rotatable cylindrical member having an eccentric bore for mounting the light-emitting end transverse to the plane of the planar surface, rotation of the cylindrical member causing a change in the transverse position of the light-emitting end relative to the plane.

6. The cutting apparatus of claim 3, comprising a plurality of light transmission lines, each including a light-emitting distal end for producing a conical beam of light, and a plurality of mounting means for mounting each of the light-emitting ends transverse to the plane of the planar surface of the knife, the plane of the planar surface generally bisecting each light-emitting ends, thereby to project substantially one-half of each conical beam produced by the light-emitting ends along the planar surface and create an elongated line between the shadow area and a plurality of substantially semicircular light areas on the material.

7. The cutting apparatus of claim 6 wherein the light-emitting ends are mounted at equally spaced-apart intervals along the knife, the interval between each two adjacent light-emitting ends being generally equal to the radius of the substantially semicircular light areas to produce an overlapping pattern of the light areas on the material.

8. The cutting apparatus of claim 1 wherein the optical means includes an elongated slot extending substantially the length of the knife and transverse to the planar surface thereof.

9. The cutting apparatus of claim 8, wherein the carriage is formed to include the elongated slot and further comprising connecting means for connecting the knife to the carriage, the slot and knife being moved coincidently in response to movement of the carriage.

10. The cutting apparatus of claim 9 wherein the plane of the planar surface generally bisects the slot longitudinally, substantially one-half of the beam of light being projected along the planar surface to produce a generally rectangular light area on the sheet of material, the luminous intensity of the light area being greatest in proximity to the line between the shadow area and light area.

11. The cutting apparatus of claim 10, further comprising mounting means for mounting the light source in a fixed position away from the carriage and knife.

12. The cutting apparatus of claim 11 wherein the light-emitting end of the transmission line is mounted on the carriage in a position to direct the light beam through the slot to project the beam of light along the planar surface.

13. The cutting apparatus of claim 10, wherein the light source is mounted to the carriage to be situated adjacent to the elongated slot, the light source, slot, and knife being moved coincidently in response to movement of the carriage.

14. The improvement of claim 1 wherein the beam of light is generally conical-shaped and the plane of the planar surface generally bisects the light-emitting end of the transmission line, substantially one-half of the conical beam being projected along the planar surface to produce a substantially semicircular light area on the material.

15. The improvement of claim 14 wherein the mounting means includes adjustment means for transversely positioning the light-emitting end of the transmission line in relation to the plane of the planar surface to assure that the plane substantially bisects the light-emitting end.

* * * * *